Dec. 11, 1928.

J. C. HOWARD 1,694,595

VALVE

Filed May 5, 1927

Inventor
JESSE C. HOWARD his Attorneys

Patented Dec. 11, 1928.

1,694,595

UNITED STATES PATENT OFFICE.

JESSE C. HOWARD, OF COLUMBUS, OHIO.

VALVE.

Application filed May 5, 1927. Serial No. 189,139.

This invention relates to reciprocating valves especially for liquid conductors.

The object of the invention is to provide an improved and simplified swivel connection between a valve head and its threaded stem whereby the stem can be more or less rotated in the head after the valve has been seated and thereby avoid wear on the valve lining by rotation on its seat.

The invention is embodied in the example herein shown and described, the feature of novelty being finally claimed.

In the accompanying drawing—

Figure 1:
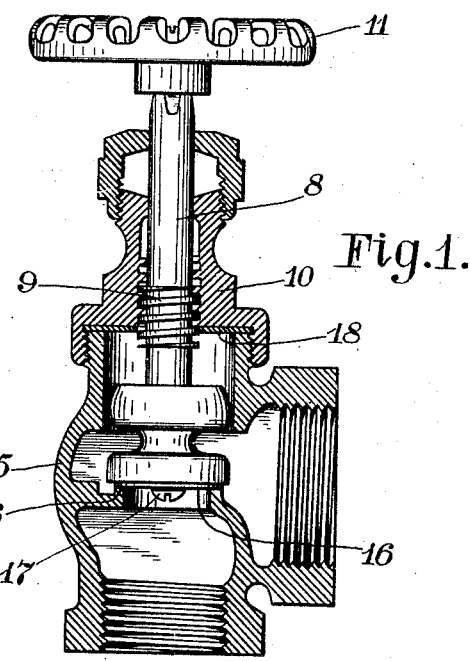
Figure 1 is a vertical section of a valve case showing the valve and its stem in full therein.
Figure 2:
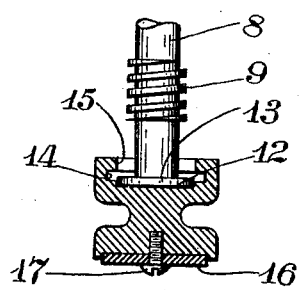
Fig. 2 is a sectional view of the valve head with the swivel-head end of the stem placed therein before the connection is effected.

In the views 5 designates the usual valve casing, it having a valve seat at 6 between the inlet and outlet passages of the casing.

7 designates the valve head, and 8 the operating stem therefor, said stem being provided with a short threaded portion at 9 engaging a threaded portion in the cap 10 so that by turning the hand wheel 11 of the stem in the proper direction the valve can be raised or lowered as usual in such structures.

In the present instance the valve head is formed out of a cylindric block having its upper end recessed internally to form a circular shallow socket 12 to receive a laterally projecting circular swivel head 13 and above this an annular groove 14 and above this an opening 15 of sufficient size to just about permit the swivel head to be passed therethrough to the socket 12.

Figure 3:
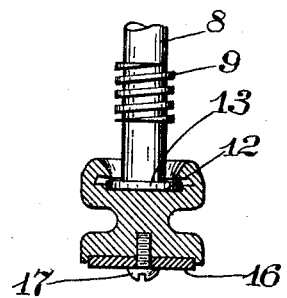
Fig. 3 is a view similar to Fig. 2 showing the connection effected.

The swivel head is first placed in the socket and then the material of the head above the annular groove 14 pressed with a suitable tool so that it is extended inward over the flange of the swivel head substantially as shown in Fig. 3, thereby preventing the separation of the head from the stem but permitting the turning of the swivel head in the valve head or conversely. The annular groove 14 admits of the ready and quick shaping or pressing of said portion into the position described.

The lower end of the valve head is lined with an ordinary washer 16 of fibre, rubber compound or other suitable material held on said head by a set screw 17.

A washer 18 is shown as interposed between the cap 10 and the valve casing, against which washer the valve head impinges when elevated to its extreme upper position. When the valve head is thus elevated leakage of water through the cap is prevented.

In practice the valve head can be raised or lowered by turning the hand wheel as usual and the valve and stem may turn together, but when the washer 16 is lowered into contact with the valve seat or the valve head raised into contact with washer 18 the head ceases to turn, and a slight further turn of the stem suffices firmly to close the passage between the fluid inlet and outlet or the leakage of water upward around the stem as the case may be. Because of the V-form shown imparted to the valve head at its upper end it exerts a slightly penetrating effect into the washer 18, and therefore serves to quite effectually prevent leakage through the cap around the upper part of the stem.

The forms of the parts can be changed without departing from the gist of the invention as claimed.

What I claim is:

1. In a device of the kind described, a valve stem having a flanged swiveling head, and a valve head recessed to receive said stem head, the wall of said recess above the bottom thereof provided with an annular groove, the material of the recessed portion of said head above the annular recess pressed into retaining swiveling engagement with said swiveling head.

2. In a device of the kind described, a valve stem having a flanged head, a valve head having a recessed portion to receive the wall of said stem head, said recessed portion being annularly grooved above the bottom thereof and the upper end of said recessed portion pressed into retaining engagement with said stem head, the head of said stem fitting in the bottom of said recess.

3. In a device of the kind described, a valve stem having a head, a valve head having a recessed portion to receive said stem head, said recessed portion being annularly grooved above the bottom thereof and pressed thereabove to form a valve and into retaining and socketed engagement with said stem head.

JESSE C. HOWARD.